Patented Feb. 14, 1939

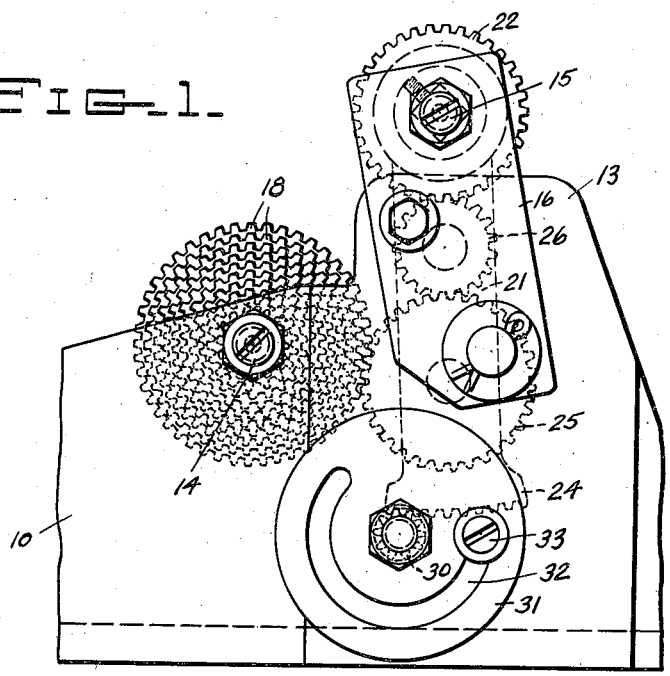
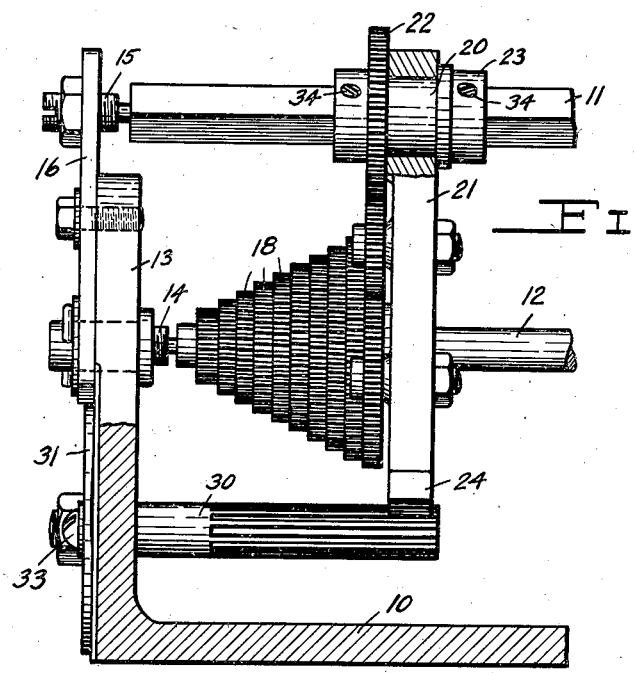

2,146,787

UNITED STATES PATENT OFFICE 2,146,787

CHANGE GEAR MECHANISM

Carl H. Bissell, Syracuse, N. Y., assignor to Crouse-Hinds Company, Syracuse, N. Y., a corporation of New York Application April 28, 1937, Serial No. 139,550

1 Claim. (Cl. 74—348)

This invention relates to change speed gearing, and has as an object a change speed gearing which is particularly economical in manufacture and efficient in operation, and which will effect a comparatively great number of different speed ratios between a driving and driven shaft.

The invention has as a further object, a change speed gearing mechanism involving a structure by which the gearing is conveniently changed from one ratio to another and secured in any one of several operative positions, and which construction may be housed in a comparatively small space.

The invention consists in the novel features and in the combinations and constructions hereinafter set forth and claimed.

In describing this invention, reference is had to the accompanying drawing in which like characters designate corresponding parts in all the views.

Figure 1 is an end elevational view of a frame member in which my change speed gearing mechanism is mounted.

Figure 2 is a view, looking to the left of Figure 1, illustrating the arrangement of the gearing and contiguous portion of the frame member.

The embodiment of the invention as here shown comprises a suitable frame member 10 in which are rotatably mounted a driving shaft 11 and a driven shaft 12 arranged in parallel relationship.

The frame may be of any suitable size and construction, depending on the machine or device with which the change speed gearing is associated. In the present instance, the structure comprises a portion of a motor operated traffic signal timer. The power of the motor is applied to the driving shaft 11, and the cycle switching mechanism is associated and operated by the driven shaft 12.

The timer is housed or mounted in a cabinet of such dimensions as to accommodate the timer, and one of the objects of this invention is a change gear construction, the adjustment of which does not add to the over-all dimensions of the timer. Inasmuch as the mechanism of the timer per se, forms no part of this invention, only one end portion of the frame is shown, which includes an end plate 13 in which a bearing member 14 is mounted to receive one end of the shaft 12. The complemental end of the shaft 11 is mounted upon a bearing member 15 carried by an extension bracket 16 secured to the end plate 13.

A plurality of gears 18 are mounted as a unit on the driven shaft 12 and are fixed thereto and rotatable therewith. The gears 18 vary in diameter from one end of the unit to the other. A sleeve 20 is slidably mounted upon the driving shaft 11 which is of square, cross sectional form, or provided with a suitable key to provide a driving connection between the shaft 11 and the sleeve 20. The outer surface of the sleeve 20 is cylindrical in form, and one end of a bracket 21 is pivotally mounted thereon. A gear 22 is secured to one end of the sleeve and is rotatable therewith, and a collar 23 is secured to the sleeve 20 on the opposite side of the bracket 21. With this structure, rotary motion is imparted to the sleeve 20 and gear 22 by shaft 11, and the entire unit, including the sleeve and bracket 21, are slidable axially on the shaft 11, and the lower portion of the bracket is movable about the sleeve 20 toward and from the shaft 12. The lower end of the bracket 21 is formed or provided with a gear quadrant 24, and one or more gears are rotatably mounted upon the bracket. In the structure disclosed, there are two of such gears, a lower gear 25 and an intermediate or idler gear 26 meshing with the gears 22 and 25.

An elongated pinion 30 is rotatably mounted in the plate 13 and extends in parallel relationship to the shafts 11, 12, and is arranged in mesh with the gear quadrant 24 on the lower end of bracket 21. The teeth of the pinion 30 are of such length as to permit the bracket 21 and gears 22, 25, 26, to be moved axially of the shafts 11, 12, into alinement with any one of the gears 18. The bracket is moved toward and from the driven shaft 12 about the axis of the driving shaft 11 by rotating the pinion 30, to the outer end of which is secured an operating manual in the nature of a disk 31 formed with an arcuate slot 32. After the pinion is rotated a proper distance to bring the gear 25 into engagement with the selected one of the gears 18, a screw 33, extending through the slot 32 and threaded into the plate 13, is tightened and the pinion 30 retained against rotary motion, and the bracket 21 is held in proper adjusted position. The bracket 21 is held in adjusted position against axial movement by set screws 34 threaded into the ends of the sleeve 20 and engaging the surface of the driving shaft 11.

It will be observed that this structure does not employ any handles or the like arranged externally of the frame member for shifting the bracket 21 either axially or radially of the shaft 12. However, the bracket 21 is adequately secured in adjusted position against both axial and radial movements.

What I claim is:

The combination of a frame, driving and driven shafts rotatably mounted in said frame and extending in parallel relationship, of change speed mechanism comprising a bracket rotatably mounted at one end on one of said shafts and being movable axially thereof, said bracket being provided on its opposite end with a gear quadrant, a plurality of gears of different diameter secured to and rotatable with said other shaft, a gear carried by said bracket and arranged concentrically of the said first mentioned shaft and being rotatable therewith, a second gear carried by the bracket in operative arrangement with said first gear, an elongated pinion rotatably mounted in the frame and extending parallel to said shafts arranged in sliding mesh with the quadrant on said bracket and being operable from the exterior of the frame to move said quadrant toward and from said second shaft to move said second gear into and out of engagement with the respective gears carried by said shaft during axial movement of said bracket, and means operable to secure said pinion to said frame and maintain said bracket in adjusted position.

CARL H. BISSELL.